(No Model.)
P. E. LITTLE.
DISK HARROW.
No. 583,914. Patented June 8, 1897.
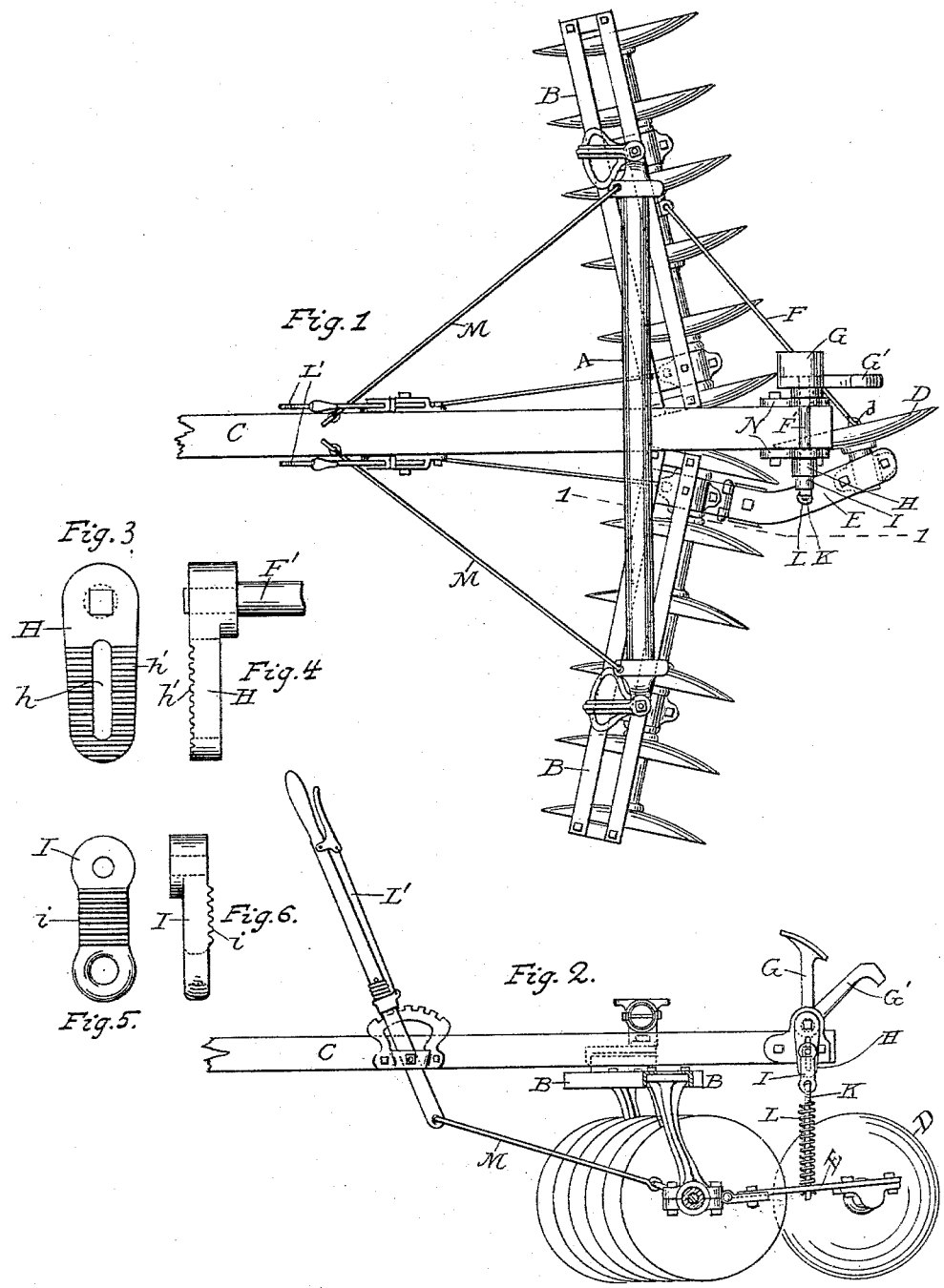
Witnesses.
Fred. J. Lawrence
Walter M Elius
Inventor.
Peter E. Little by
Robert W. Heardie Atty

UNITED STATES PATENT OFFICE.

PETER E. LITTLE, OF DAYTON, OHIO, ASSIGNOR TO THE OHIO RAKE COMPANY, OF SAME PLACE.

DISK HARROW.

SPECIFICATION forming part of Letters Patent No. 583,914, dated June 8, 1897.

Application filed November 25, 1896. Serial No. 613,414. (No model.)

*To all whom it may concern:*

Be it known that I, PETER E. LITTLE, a citizen of the United States, residing at Dayton, in the county of Montgomery and State of Ohio, have invented certain new and useful Improvements in Disk Harrows; and I do hereby declare the following to be a full, clear, and exact description of the invention, such as will enable others skilled in the art to which it appertains to make and use the same.

My invention has for its object to provide means for cultivating the central ridge of earth usually left between the inner ends of the gangs of a disk harrow. This I accomplish by the means illustrated in the accompanying drawings, in which—

Figure 1 is a plan view of my device attached to a disk harrow. Fig. 2 is a vertical longitudinal section taken on line 1 1 of Fig. 1. Fig. 3 is a front view of an oscillating arm forming part of locking mechanism. Fig. 4 is a side view of the arm shown in Fig. 3. Fig. 5 is a front view of link for locking mechanism. Fig. 6 is a side view of said link.

The main portion of the disk harrow illustrated in the drawings is of usual construction, consisting generally of a pole C, a crossbar A, having disk gangs B pivoted thereto, so as to permit of angular adjustment of said gangs. An auxiliary disk D is mounted on an arm E, which arm is hinged to one of the disk gangs and arranged at the rear of the inner ends of said gangs. A brace-rod F is connected freely at one end with a stud or eye $d$, secured to the central portion of said auxiliary disk, and the other end of said rod is freely secured to one of the gang-bars B. A rock-shaft F' is journaled on the rear extension of the pole C, and is provided on one end with foot-levers G and G' and on the other end with an oscillating arm H, which is preferably notched or serrated on one side and provided with a groove $h$. A link I, provided with a toothed or serrated side, is adjustably secured to the arm H, so as to vary the height of said link. The lower end of the link I is connected with a bolt K, the lower end of which is secured to the hinged arm E. A spiral spring L encircles said bolt K and bears upon the hinged arm E, so as to press said arm downward and force the disk D into the ground.

When the device is in use and the foot-lever G is in the position indicated in the drawings, the arm H is arranged vertically or in line with the bolt K, thereby preventing any upward movement of the disk D. When, however, it is desired to raise the disk D out of the ground, the lever G' is pressed downward and the arm H is then raised into a substantially horizontal position, which permits the hinged arm E and the disk D to be raised. The link I may be adjusted on the arm H by means of the slot $h$ and an engaging bolt, so that the disk may be held at the desired depth in the ground when in use.

What I claim is—

1. In a disk harrow, the combination with a main frame, of disk gangs pivoted thereto, an auxiliary central disk mounted on an arm hinged to one of said gangs, a rock-shaft mounted on the main frame and provided with an oscillating arm, a link adjustable vertically on said oscillating arm, and a rod connecting said adjustable link and hinged arm, substantially as shown and described.

2. In a disk harrow, the combination with a main frame, and disk gangs pivoted thereto, of a central auxiliary disk mounted on an arm hinged to one of said gangs, a rock-shaft provided with an oscillating arm, a link adjustable on said oscillating arm, a rod connecting said link and hinged arm, and a spring mounted upon said connecting-rod so as to bear against said hinged arm, substantially as shown and described.

In testimony whereof I affix my signature in presence of two witnesses.

PETER E. LITTLE.

Witnesses:
KATHARINE P. EVANS,
W. H. H. ECKI.